Dec. 22, 1964    O. T. McILVAINE    3,162,743
THERMALLY ACTUATED SWITCH COMPENSATED
FOR AMBIENT TEMPERATURE VARIATIONS
Filed Sept. 19, 1961

INVENTOR
ORAN T. McILVAINE

BY
ATTORNEYS

United States Patent Office 3,162,743
Patented Dec. 22, 1964

3,162,743
THERMALLY ACTUATED SWITCH COMPENSATED FOR AMBIENT TEMPERATURE VARIATIONS
Oran T. McIlvaine, St. Charles, Ill.; The St. Charles National Bank, administrator of said Oran T. McIlvaine, deceased, assignor to Nettie R. McIlvaine, St. Charles, Ill.
Filed Sept. 19, 1961, Ser. No. 139,130
5 Claims. (Cl. 200—138)

This invention relates to a thermally actuated switch for detecting infrared radiation and, more particularly, to a switch device for detecting a change in the intensity of radiation.

Electrical switches constructed to function as infrared detectors are primarily used to detect the presence or absence of a flame. Infrared flame detectors are usually mounted remotely from the flame, but positioned such that the infrared detection element "sees" the flame. They are to be distinguished from the thermal expansion type of flame detectors, such as are operated by bimetal strips, since the thermal type detectors must be mounted close enough to the flame to be heated by it. An infrared detector may be mounted entirely outside of the furnace to view the flame through a silicon, quartz or glass window, without being heated by the flame.

Compared with bimetal detectors which are used in relatively low temperatures flames, such as encountered in water heaters or clothes dryers, infrared detectors are preferred over thermal detectors, since they may be mounted remotely from the heat of the flame, and may be constructed more delicately. Therefore, infrared detectors provide a more accurate indication of temperature and respond more rapidly. Furthermore, infrared detectors may be used to measure considerably higher temperatures than can be measured by bimetal devices.

One difficulty with infrared detectors that are presently available is that they react only to absolute changes in the level of radiation. They do not compensate for changes in the level of ambient radiation. In many installations, it is necessary to measure the change in radiation caused by a change in flame intensity or by its being extinguished. A valve or alarm can then be operated in response to the change in level of radiation. Another advantage of measuring change in radiation rather than absolute radiation is that the same device can be used in different installations having different levels of radiation without adjusting the device.

Accordingly, it is an object of this invention to provide an infrared detection switch which responds to changes in intensity level.

It is another object of this invention to provide a thermally actuated switch which compensates for changes in ambient radiation conditions.

It is a further object of this invention to provide a radiation responsive switch which is small and compact so that it can be mounted within, or adjacent to, the combustion chamber.

In a preferred embodiment of this invention, the detector comprises a radiation target mounted on a bimetallic strip. The end of the bimetallic strip is provided with an electrical contact. Adjacent to the bimetallic strip is a contact strip provided with an electrical contact at its end and located directly opposite to that of the bimetallic strip. The opposite end of the contact strip is mounted on a shaft. Also mounted on the shaft is a compression spring and a bushing which form a friction pivot for the contact strip, so that it does not move under its own weight, but a small force at the end of the strip causes the strip to change its angular position and the new position will be maintained. A connecting link is rigidly secured to the free end of the metal strip and extends over the end of the bimetallic strip. A bearing on the end of the link engages the free end of the bimetallic strip. On the side of the bimetallic strip which is opposite from that which faces the metal contact strip, a target disc is mounted on the bimetallic strip. The strip is colored black to absorb radiation. Radiation which impinges on the target disc is absorbed and converted to heat. The heat of the disc is conducted to the bimetallic strip, causing it to distort and move away or move into contact, depending upon operation desired from the contact strip. The connecting link on the contact strip causes this strip to pivot with the bimetallic strip as the level of radiation increases. The friction clutch at the base of the contact strip allows the contact strip to pivot under the force of the expansion of the bimetallic strip. Thus, when there is a sudden drop in the intensity of radiation, the bimetallic strip contracts only a short distance before contacting the contact strip. The connecting link therefore provides a constant and rapid response.

This preferred embodiment of the invention is illustrated in the accompanying drawings, in which.

Figure 1:
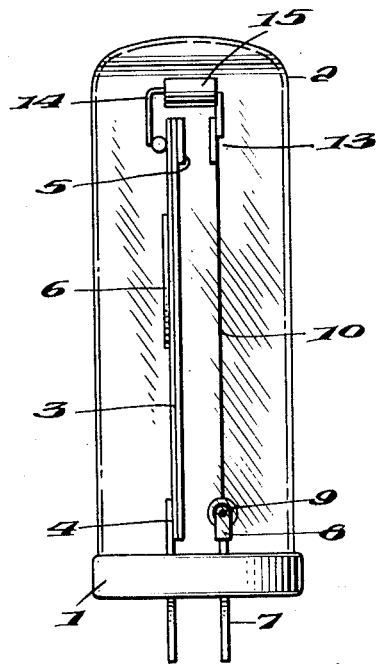
FIGURE 1 is a front elevational view of the infrared detector of this invention.
Figure 2:
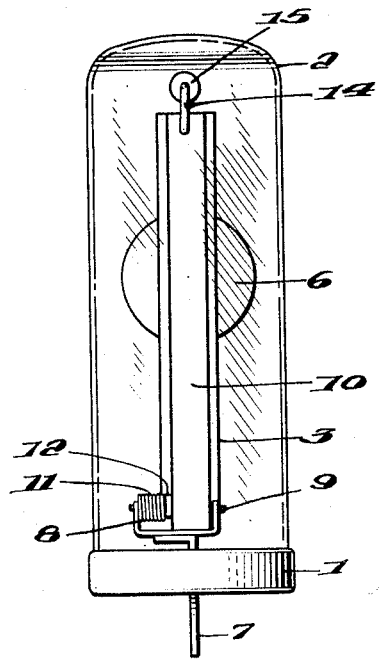
FIGURE 2 is a side elevational view of the detector.

The infrared detector of this invention is mounted on a conventional tube base 1 and enclosed by a glass envelope 2. The base 1 is shown as a flat disc, but the base could have any suitable shape which would support the internal elements. A bimetallic strip 3 is mounted on a terminal pin 4 and extends upward within the envelope 2. The upper end of the bimetallic strip 3 is provided with an electrical contact element 5. On the exterior side of the bimetallic strip 3, a target disc 6 is mounted. The disc 6 is secured to the bimetallic strip 3 by solder or other thermally conductive material. It is desirable that the target be as thin as possible so that its temperature change may be rapid in response to changes in radiation. As an alternative, the disc 6 may be formed integrally with the strip 3.

Mounted on a terminal pin 7 adjacent to the terminal pin 4 for the bimetallic strip, is a bracket 8. The bracket 8 supports a shaft 9 on which a movable contact strip 10 is mounted. The end of the contact strip 10 is attached to the shaft 9 by soldering, or the end of the strip may be wrapped around the shaft and rotatable relative to the shaft. Also mounted on the shaft 9 is a compression spring 11 which is compressed between the bracket 8 and a bushing 12 which bears against the edge of the contact strip 10 to retard pivotal movement of the strip on the shaft.

The contact element 10 extends upward through the envelope 2 parallel to the bimetallic strip 3. The end of the contact strip 10 is provided with an electrical contact element 13, which is mounted oppositely from the electrical contact element 5 and in position to be engaged by the element 5 when the strip 3 and strip 10 are moved together.

The maximum distance between the elements 5 and 13 is limited by means of a connecting link 14 which is secured to the end of the contact strip 10 and extends over the end of the bimetallic strip 3 in position to engage the exterior surface of the bimetallic strip. A dielectric spacer 15 in the connecting link 14 electrically insulates the bimetallic strip 3 from the contact element 10.

The friction clutch maintains sufficient pressure on the contact strip 10 to prevent its movement under its own weight. It is free enough, however, to be pulled by the connecting link 14 in response to expansion of the bimetallic strip 3. Thus, when there is an increase in radiation and the bimetallic strip 3 expands, pivoting counterclockwise as shown in FIGURE 1, the movement of the end of the strip 3 will be transmitted through the connecting link 14 to pivot the contact element 10 a corresponding distance. If the radiation should decrease, the bimetallic strip 3 pivots clockwise and the friction clutch maintains the contact strip 10 in the original position, so that the contact element 5 moves toward the contact element 13 to close or to open the switch if desired. For a burner safety control the contact would be closed in the presence of radiation and open on the loss of radiation.

In operation, the infrared detector is connected by pin terminals 4 and 7 to an electrical operating circuit, which may include a warning device or a motor for operating a gas valve. The detector may be mounted at any convenient location at which the target disc 6 would be in line of sight with the radiation of the flame. The envelope 2 may be made from a material which would give a selective response. For example, a gas flame has practically no visible radiation, so that the envelope could be made of silicon or germanium or a glass which transmit only infrared radiation.

The bimetallic strip 3 could be mounted to expand clockwise when viewed as in FIGURE 1, in response to an increase of radiation and hence, close the contact elements 5 and 13, but for the description of operation, it will be described as expanding counter-clockwise for an increase in radiation. The radiation impinges on the target 6 and the energy absorbed heats the disc. The heat absorbed by the bimetallic strip 3 on which the target is mounted, causes the strip 3 to bend counter-clockwise, as shown in FIGURE 1. This movement is transmitted to the contact strip 10 through the connecting link 14 and insulator 15. Under the steady flow of infrared radiation, the elements will remain in this position. If flame is the source of radiation and the flame is extinguished, the level of radiation decreases and the bimetallic element 3 will bend clockwise. The electrical contact element 5 will then engage the contact element 13 to close the electrical circuit between the terminal pins 4 and 7, to actuate the operational circuit.

Figure 3:
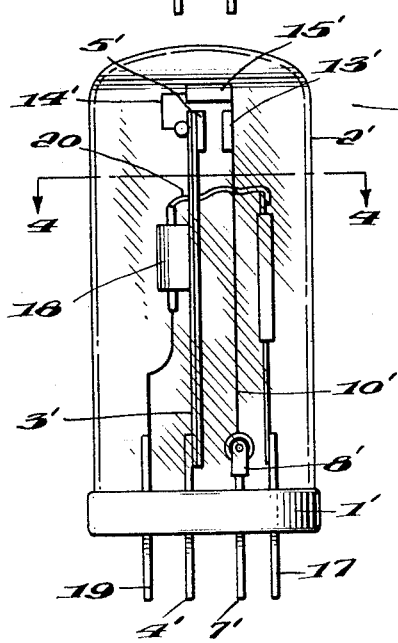
FIGURE 3 is a front elevational view of a modified form of this invention.
Figure 4:
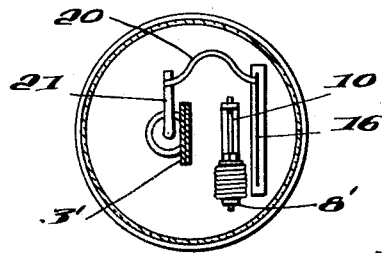
FIGURE 4 is a cross-sectional view of the modified form of the invention, along the line 4—4 in FIGURE 3.

A modified form of this invention is shown in FIGURES 3 and 4. It includes the base 1', envelope 2', bimetallic strip 3', contact strip 10' and the connecting link 14'. The important difference between this form of the invention and that previously described, is that a miniature photocell 16 is mounted on a terminal pin 17 adjacent to the contact strip 10'. A resistance element 18 is secured to the bimetallic strip 3' and electrically connected to a pin terminal 19. A flexible lead 20 is secured to a tab 21 on the end of the resistance element 18 and extends outward therefrom and is electrically connected to the photocell 16. Thus, there are two circuits within the envelope 2'. The first circuit includes the control elements, including the photocell 16 and the resistance element 18. The second circuit includes the infrared responsive switch, including elements 5' and 13', as previously described.

In operation, a photocell circuit is connected between the terminal pins 17 and 19 and an electric operational circuit is connected between the terminal pins 4' and 7'. Light impinging on the photocell 16 generates a current which flows through the flexible lead 20 and through the resistance element 18. This current heats the resistance element 18 and the heat is transmitted to the bimetallic strip 3', thereby causing the contacts 5' and 13' to separate, or to close if desired.

While this invention has been illustrated and described in only two embodiments, it is recognized that variations and changes may be made therein, without departing from the invention as set forth in the claims.

I claim:

1. A radiation responsive switch comprising a base, a bimetallic strip mounted on the base, a bracket mounted on the base, a contact strip pivotally mounted on the bracket to swing toward and away from the bimetallic strip, frictional retention means permitting pivotal movement of the contact strip in response to an applied force and retaining said contact strip substantially in the position to which it is displaced after the removal of such force, linkage means between said strips limiting the distance of separation therebetween, means for absorbing radiation and converting it to heat, and means for conducting said heat to the bimetallic strip to expand the bimetallic strip to engage the contact strip.

2. A radiation responsive switch comprising a base, a bimetallic strip mounted on the base, a contact strip, means for frictionally supporting and retaining the contact strip adjacent the bimetallic strip in positions to which it is urged by applied forces, and a link extending between said strips, one end of said link being secured to one of the strips and the opposite end of said link overlapping the other of said strips whereby expansion of the bimetallic strip in one direction engages the link to displace the contact strip and contraction of the bimetallic strip in the opposite direction disengages the link.

3. A radiation responsive switch comprising a base, a bimetallic strip mounted on the base, a contact strip, means for frictionally supporting and retaining the contact strip adjacent the bimetallic strip in positions to which it is urged by applied forces, and a link mounted on the contact strip and extending over the side of the bimetallic strip opposite the contact strip, whereby upon expansion of the bimetallic strip, away from the contact strip, the bimetallic strip engages the link to displace the contact strip a corresponding distance and upon contraction of the bimetallic strip toward the contact strip, the bimetallic strip disengages from the link and the contact strip is not displaced.

4. A radiation responsive switch comprising a base, a bimetallic strip having one end rigidly secured in the base, a bracket mounted on the base, a contact strip mounted on the bracket, frictional retention means permitting pivotal movement of the contact strip with respect to the bracket in response to an applied force and retaining said contact strip substantially in the position to which it is displaced after the removal of such force, spacing linkage between the said strips, means for absorbing radiation and converting it to heat, and means for conducting said heat to the bimetallic strip to expand the bimetallic strip to engage the contact strip.

5. A thermally actuated switch compensated for ambient temperature variations comprising: a base, a first electrical contact member, means mounting said first contact member on said base, said mounting means including frictional retention means permitting displacement of said first contact member in response to an applied force and retaining said first contact member substantially in the position to which it is displaced after the removal of such force, a condition responsive bimetallic member mounted on said base for flexure toward and away from said contact member in response to temperature variations, a second electrical contact member mounted for movement with said bimetallic member to cooperate with said first contact member, and linkage means for limiting the separation distance between said first contact member and said bimetallic member.

References Cited by the Examiner

UNITED STATES PATENTS

| | | | |
|---|---|---|---|
| 1,684,709 | 9/28 | Lowenstein | 200—122 |
| 2,192,960 | 3/40 | Bokovoy | 73—362 |
| 2,312,671 | 3/43 | Otto | 73—362 |
| 2,390,947 | 12/45 | Koci | 200—138 X |
| 2,714,668 | 8/55 | Zinn | 250—83 |
| 2,835,779 | 5/58 | Kazan | 200—122 |
| 2,867,703 | 1/59 | Koslow | 200—138 |
| 3,027,495 | 3/62 | Frank | 250—206 |
| 3,093,744 | 6/63 | Tabet | 250—206 |
| 3,105,889 | 10/63 | Van Boort et al. | 200—122 |

FOREIGN PATENTS

| | | |
|---|---|---|
| 470,857 | 5/26 | Germany. |
| 575,823 | 3/46 | Great Britain. |
| 251,432 | 10/47 | Switzerland. |
| 553,278 | 2/58 | Canada. |

BERNARD A. GILHEANY, Primary Examiner.

RALPH G. NILSON, Examiner.